(12) United States Patent
Boecker et al.

(10) Patent No.: US 7,460,945 B2
(45) Date of Patent: Dec. 2, 2008

(54) METHOD AND DEVICE FOR REGULATING THE SPEED OF A VEHICLE

(75) Inventors: Juergen Boecker, Stuttgart (DE);
Hermann Winner, Bietigheim (DE);
Goetz Braeuchle, Reichartshausen (DE)

(73) Assignee: Robert Bosch GmbH, Stuttgart (DE)

( * ) Notice: Subject to any disclaimer, the term of this patent is extended or adjusted under 35 U.S.C. 154(b) by 758 days.

(21) Appl. No.: 10/514,083

(22) PCT Filed: May 27, 2003

(86) PCT No.: PCT/DE03/01719

§ 371 (c)(1),
(2), (4) Date: Nov. 9, 2004

(87) PCT Pub. No.: WO2004/039622

PCT Pub. Date: May 13, 2004

(65) Prior Publication Data

US 2006/0047401 A1    Mar. 2, 2006

(30) Foreign Application Priority Data

Oct. 31, 2002    (DE) .............................. 102 50 679

(51) Int. Cl.
*G05D 1/00* (2006.01)
(52) U.S. Cl. .............................. 701/93; 701/94; 701/96; 180/170
(58) Field of Classification Search .................. 701/93, 701/94, 96, 300; 180/170
See application file for complete search history.

(56) References Cited

U.S. PATENT DOCUMENTS

| 5,929,785 | A | 7/1999 | Satonaka |
| 6,175,799 | B1 | 1/2001 | Tsutsuimi et al. |
| 6,362,729 | B1 | 3/2002 | Hellmann et al. |
| 6,820,709 | B1 * | 11/2004 | Zimmermann et al. ...... 180/169 |

FOREIGN PATENT DOCUMENTS

| DE | 197 43 726 | 4/1998 |
| DE | 199 19 888 | 11/1999 |
| DE | 198 57 992 | 6/2000 |
| DE | 199 58 520 | 6/2001 |
| EP | 0 348 691 | 1/1990 |

OTHER PUBLICATIONS

"Adaptive Cruise Control System—Aspects and Development Trends," SAE Paper 961010, SAE International Congress and Exposition, Detroit, Feb. 26-29, 1996.

* cited by examiner

*Primary Examiner*—Khoi H. Tran
*Assistant Examiner*—Marie A Weiskopf
(74) *Attorney, Agent, or Firm*—Kenyon & Kenyon LLP

(57) ABSTRACT

In a method and a device for regulating the speed of a vehicle including an object detection system in the sense of an adaptive distance and speed control system, the adaptive distance and speed control system includes at least two operating modes. In the first operating mode, a vehicle speed between standstill and a limiting speed is set, and in the second operating mode, a vehicle speed between a limiting speed and a maximally regulable speed is set. In the first operating mode, in the absence of a speed-limiting object, the vehicle speed is increased beyond the limiting speed and thereafter is set to the limiting speed.

6 Claims, 3 Drawing Sheets

METHOD AND DEVICE FOR REGULATING THE SPEED OF A VEHICLE

FIELD OF THE INVENTION

The present invention relates to a method and a device for regulating the speed of a vehicle having an object detection system, e.g., in the sense of an adaptive distance and speed control system having at least two operating modes. In the first operating mode, a vehicle speed between standstill and a limiting speed is set, and in the second operating mode a vehicle speed between a limiting speed and a maximum regulable speed is set. In the absence of a speed-limiting object in the first operating mode, the vehicle speed is increased beyond the limiting speed and is then set to the limiting speed.

BACKGROUND INFORMATION

An adaptive distance and speed control system is described in the publication "Adaptive Cruise Control System—Aspects and Development Trends," SAE paper 961010 published at the SAE International Congress and Exposition, Detroit, Feb. 26-29, 1996. In this system, radar waves are emitted and partial waves reflected by objects are received. The relative position, relative speed, and distance of objects from the host vehicle are determined from the received signals and a power-determining final control element of an internal combustion engine and/or the deceleration devices of the vehicle are triggered as a function of these determinations. If the radar sensor does not detect a lead vehicle, the host vehicle is accelerated to a set intended speed and kept at that speed. If the radar sensor detects lead vehicles, the system switches from the speed control described above to distance regulation and the host vehicle follows the lead vehicle at a constant distance at the same speed as the lead vehicle.

German Published Patent Application No. 199 58 520 describes a speed control system for a motor vehicle which regulates the driving speed of the vehicle not only above a certain minimum speed but also at speeds below a predetermined limiting speed down to vehicle standstill. Automatic moving of the vehicle may be accomplished by detection of the traffic situation by a distance sensor if the driver has responded to a corresponding moving message. The moving message is effective for a predetermined limiting time, but it may also be repeated as an alternative. However, in any traffic situation, the driver has the opportunity to override the speed control by operating the accelerator pedal or the brake pedal.

SUMMARY

An example embodiment of the present invention may provide a method and a device arranged in the sense of an adaptive distance and speed control system for regulating the speed of a vehicle having an object detection system. The adaptive distance and speed control system has at least two operating modes, the vehicle speed being settable between standstill and a limiting speed in a first operating mode. This operating mode may also be referred to as low-speed following ACC (LSF-ACC) because this operating mode is arranged for congested traffic in which the vehicle is moving only at low speeds and must stop frequently behind a lead vehicle and then begin moving again. This LSF-ACC operating mode is thus capable of automatically stopping and moving the vehicle, but the moving-off may require confirmation by the driver. In addition, this low-speed following assistant is arranged not to exceed a limiting speed. This limiting speed is in the range of 30 km/h, which also corresponds to the lower limiting speed of the second operating mode, for example. In the second operating mode, a vehicle speed is settable between a limiting speed and a maximum regulable speed. This second mode corresponds substantially to an adaptive distance and speed control system, as described in the article "Adaptive Cruise Control System—Aspects and Development Trends." In this operating mode, the speed is set between a minimum adjustable speed, which may be the maximum regulable speed of the first operating mode, for example, and an adjustable maximum speed which may be in the range of 160 km/h to 180 km/h, for example. If the vehicle is accelerated up to the first speed in the first operating mode and if the road in front of the vehicle is clear, so that higher speeds may also be set by the vehicle, the driver may be instructed to switch the speed control system from the first operating mode to the second operating mode. This is possible by a visual or acoustic display, for example, but it also may require the driver's attention and may negatively impact driving comfort, because it may be impossible to ascertain conclusively why the acoustic signal was triggered. Therefore, an example embodiment of the present invention may provide a method and a device which will instruct the driver intuitively, i.e., without any interfering and distracting acoustic and/or visual instructions, to switch from the first operating mode to the second operating mode.

The vehicle speed may be continuously regulable above limiting speed $v_0$ only after the driver has operated an operating element which switches the adaptive distance and speed control system from first operating mode A to second operating mode B.

In first operating mode A, it may be possible to implement a low-speed following mode in which the vehicle may be automatically stopped and moved again.

The driver may be informed visually and/or acoustically when the limiting speed has been set.

At least one driver-operable device may be provided so that, when this device is operated, first operating mode A switches to second operating mode B.

Implementation of the method according to an example embodiment of the present invention in the form of a control element which is provided for a control unit of an adaptive distance and speed control system of a motor vehicle may be provided. A program capable of being executed on a computer, e.g., a microprocessor or signal processor, and suitable for executing the method is stored in the control element. In this case, an example embodiment of the present invention is implemented by a program stored in the control element, so this control element, provided with the program, represents an example embodiment of the present invention in a similar manner as the method for whose implementation the program is suitable. An electric memory medium may be used, e.g., as the control element, e.g., a read-only memory.

Additional features, possible applications, and aspects hereof are set forth in the following description of exemplary embodiments of the present invention which are illustrated in the Figures.

DETAILED DESCRIPTION

Figure 1:
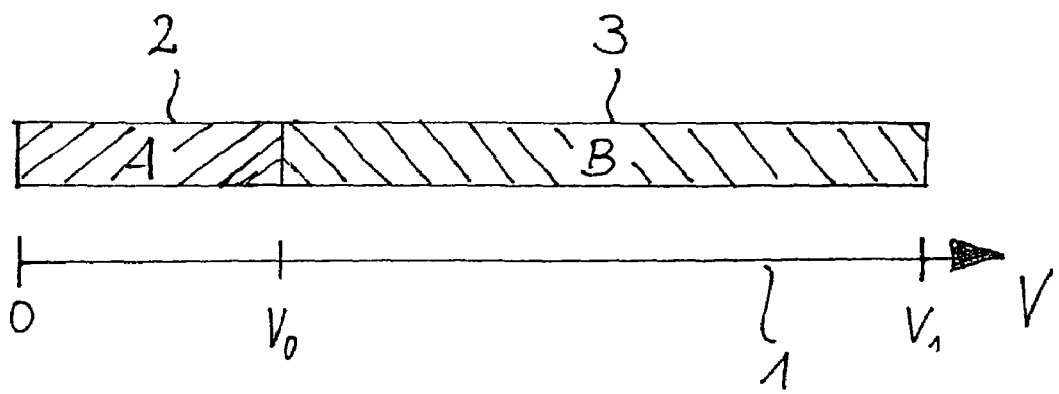
FIG. 1 illustrates the speed ranges in which operating modes A and B are active.

FIG. 1 illustrates which operating mode is activatable in which speed ranges. Speed axis 1, the left end of which represents a speed of zero, is illustrated, with the speed increasing toward the right. In addition, limiting speed $v_0$ is also entered here as well as maximum regulable speed $v_1$. Operating mode A, which may also be referred to as low-speed following control or LSF-ACC, is represented by hatched block 2. This operating mode A is in effect at speeds between 0 and $v_0$, i.e., between standstill and the limiting speed. In addition, second operating mode B is also entered in the diagram, its speed range being represented by hatched range 3. This second operating mode, which includes the normal adaptive distance and speed control mode, is in effect at vehicle speeds above limiting speed $v_0$, which is in the range of 30 km/h to 40 km/h, for example, and a maximum regulable speed $v_1$ of approximately 160 km/h to 190 km/h.

Figure 2:
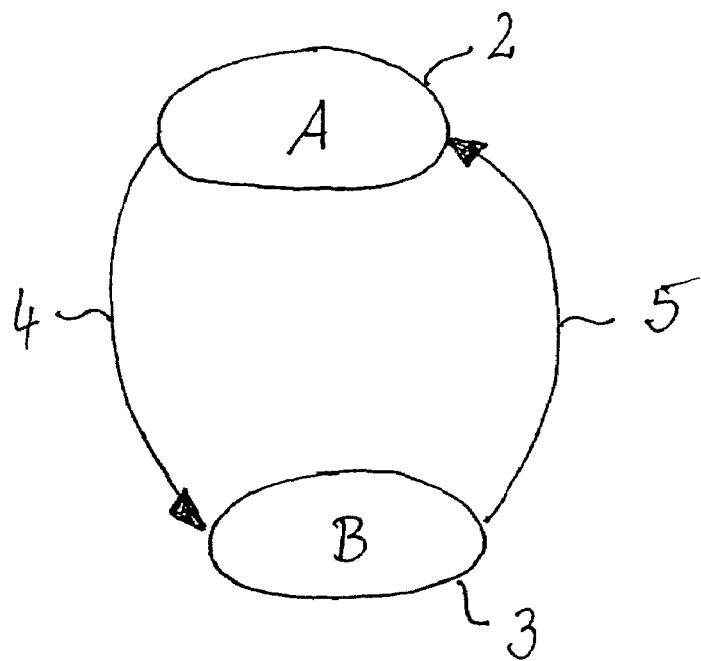
FIG. 2 illustrates a state transition diagram between operating modes A and B.

FIG. 2 illustrates a state transition diagram in which first operating mode A is represented by first state 2 and second operating mode B is represented by second state 3. Transition 4 is executed to switch from first operating mode A to second operating mode B. Transition 5 is implemented to switch from second operating mode B to first operating mode A. Transition 4, which switches the low-speed following assistant or LSF-ACC to a traditional adaptive distance and speed control mode, may be accomplished by a driver-operable operating element. Since this transition 4 is associated with a higher vehicle speed and the driver is to retain control of the vehicle at all times, transition 4 may not be automatic, but instead may occur only as a result of driver input. However, transition 5, which switches from traditional adaptive distance and speed control mode to LSF-ACC, i.e., an LSF assistant, may occur automatically because the driver recognizes the need for reducing speed and is able to implement this transition intuitively. Furthermore, it is also possible for this transition 5 to occur automatically, because when the speed is below limiting speed $v_0$ in operating mode B, i.e., the traditional adaptive distance and speed control mode, this may otherwise be deactivated and the driver may be surprised as a result of the adaptive distance and speed control system shutting down. Since the transition from operating mode A to operating mode B, i.e., from the low-speed following assistant to the adaptive distance and speed control mode, may be confirmed by the driver, it may be provided that the driver of the vehicle is notified that the road in front of the vehicle is free and the lead vehicles are moving more rapidly than the host vehicle or are even accelerating, but the host vehicle is unable to accelerate further in operating mode A due to speed $v_0$ having been reached. This message to the driver may be delivered such that it is intuitively understood by the driver and is not delivered by acoustic and/or visual signaling devices (or not exclusively).

Other operating modes, e.g., deactivated speed control, are not illustrated in FIG. 2 for reasons of simplicity. It is thus possible to deactivate the speed control from operating mode A or operating mode B at any point in time. When speed control is resumed, it is possible to activate operating mode A or operating mode B from an inactive operating mode, depending on whether the instantaneous vehicle speed is above or below limiting speed $v_0$.

Figure 3:
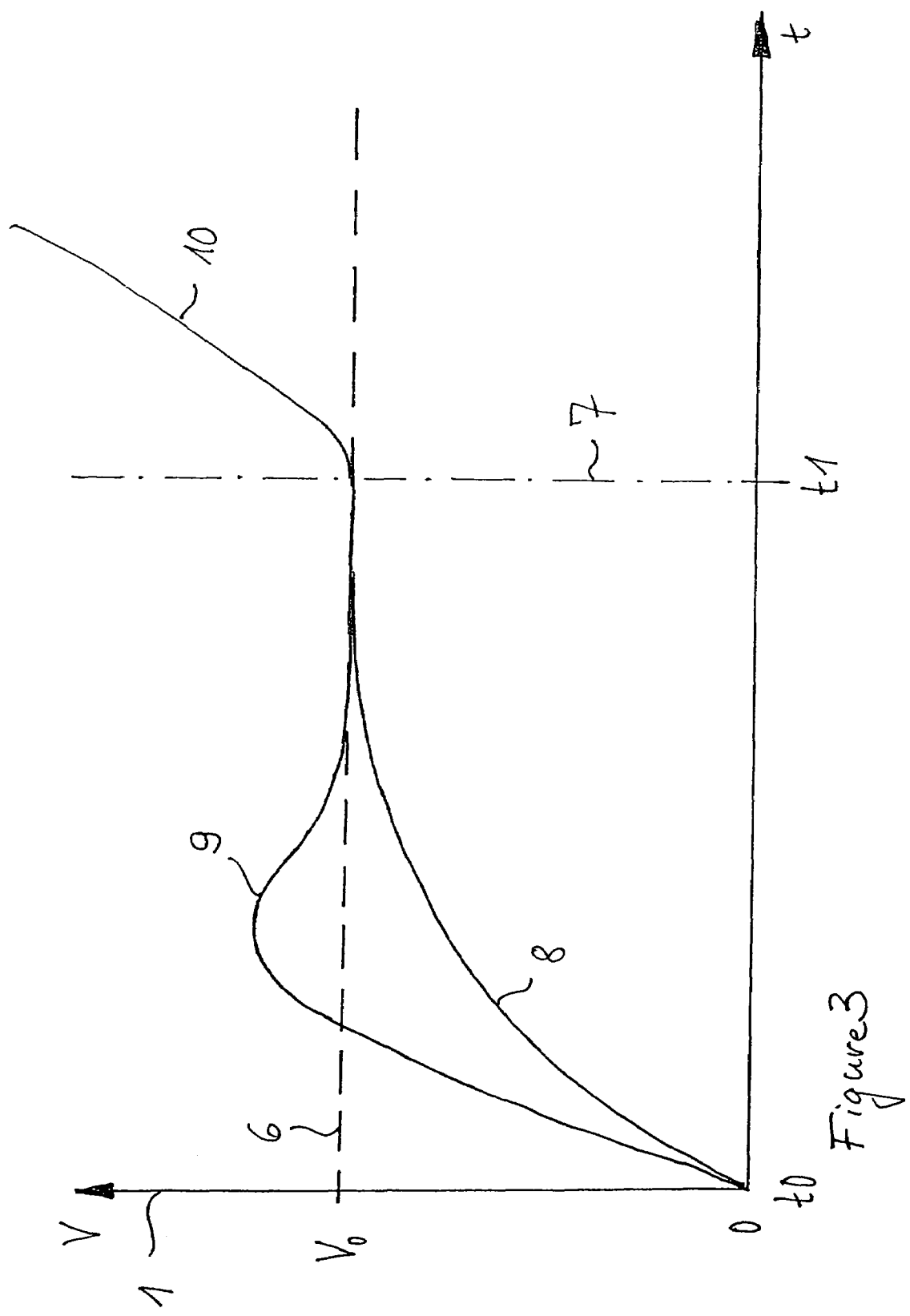
FIG. 3 illustrates a v-t diagram of the method according to an example embodiment of the present invention.

FIG. 3 illustrates a v-t diagram illustrating a kinesthetic signaling option, which notifies the driver that limiting speed $v_0$ has been reached in operating mode A and that input by the driver is necessary for further acceleration of the vehicle. A time axis is plotted on the abscissa in the diagram in FIG. 3, beginning at any point in time $t_0$ at which the vehicle is at a standstill, for example as depicted in the drawing. Vehicle speed v is plotted on ordinate 1. In addition, a horizontal line 6 is plotted, showing limiting speed $v_0$ below which operating mode A is activatable and above which operating mode B is activatable. There is a line 8 according to which the vehicle is accelerated from a standstill at time $t_0$ and limiting speed $v_0$ is regulated asymptotically according to line 8. If the driver is not concentrating fully on driving, he/she may not notice that limiting speed $v_0$ has already been reached and that driver input is required to accelerate the vehicle further. To signal to the driver kinesthetically that driver input is required, the vehicle speed is controlled as indicated by line 9. Accordingly, the vehicle is accelerated from a standstill at point in time $t_0$ and the vehicle speed is increased significantly above limiting speed $v_0$. However, object detection system 13 with which the vehicle is equipped may not detect a lead vehicle driving more slowly or too near in front, limiting the speed of the host vehicle. After the vehicle speed has been increased significantly above limiting speed $v_0$, the vehicle speed is lowered and regulated asymptotically at limiting speed $v_0$. The driver of the vehicle then notices that the vehicle is slowing down again, and if further acceleration is desired, driver input in the form of operation of an operating element may be necessary. This overshooting according to line 9 signals to the driver in a kinesthetic form and a comfortable manner that limiting speed $v_0$ has been reached, the road in front of the vehicle is free for further acceleration, and driver action is required. For example, if at time $t_1$, which is represented by line 7 in FIG. 3, the driver activates an operating element, triggering transition 4, which switches operating mode A to operating mode B, the vehicle is able to accelerate further according to line 10 and may be operated further in an adaptive distance and speed control mode.

Figure 4:
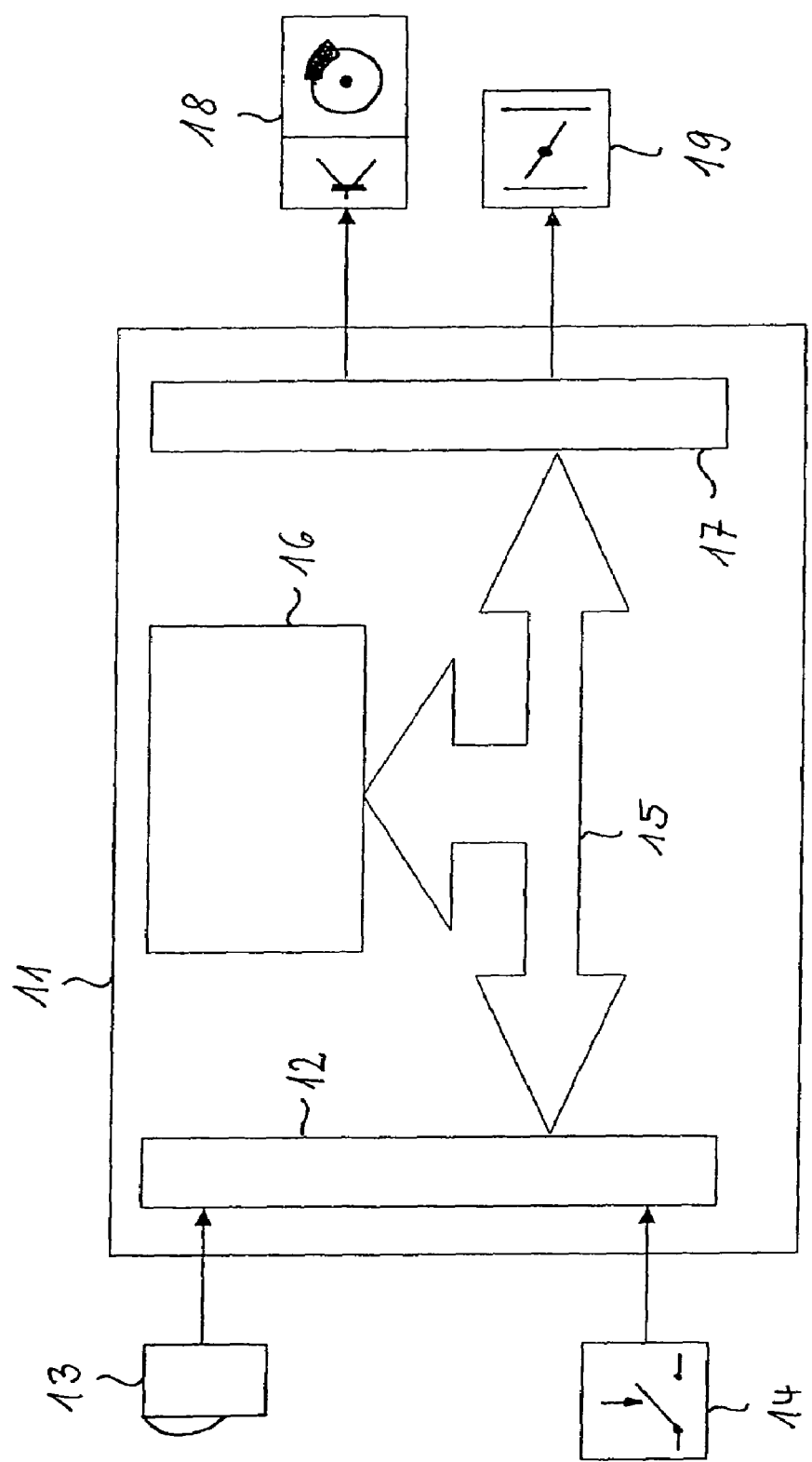
FIG. 4 illustrates a schematic block diagram of an exemplary embodiment of the device according to the present invention.

FIG. 4 illustrates a block diagram of the device according to an example embodiment of the present invention having an adaptive distance and speed control device 11. This adaptive distance and speed control device 11 has an input circuit 12 via which input signals may be sent to device 11. For example, output signals of an object detection system 13 may be provided as input signals. Object detection system 13 may be, for example, a radar system or a lidar system which emits electromagnetic radiation and receives reflected partial radiation, so that any lead vehicles are recognized and their relative positions, relative speeds, and distance from the host vehicle are determined. These variables may be output by object detection device 13 to input circuit 12 via electric signals. In addition, a driver-operable operating element 14 is provided, for example, via which the driver signals to adaptive distance and speed control device 11 that operating mode A is to be switched to operating mode B and transition 4 is triggered. This driver-operable operating element 14 may be, for example, a pushbutton on the steering wheel, on the dashboard, on the central console of the vehicle, etc. The output signal of this driver-operable operating element 14 is also sent to input circuit 12. Signals received by input circuit 12 are relayed via a data exchange system 15 to a computation device 16. In computation device 16, actuator signals for deceleration devices 18 and a power-determining actuator of an internal combustion engine 19 are calculated from the input data according to the operating mode active at the moment. The output signals are transmitted via data exchange system 15 to an output circuit 17 which the actuator signals for vehicle deceleration device 18 and a power-determining actuator of an internal combustion engine 19, which may be, for example, an electrically controlled throttle valve or a device of a fuel injection pump which influences the injection quantity. In addition, it is possible for output circuit 17 to trigger an acoustic and/or visual signaling device which notifies the driver as to whether limiting speed $v_0$ has been reached and whether driver operation is necessary.

What is claimed is:

1. A method for regulating a speed of a vehicle, the vehicle including an object detection system arranged as an adaptive distance and speed control system having at least two operating modes, a vehicle speed settable between a standstill and a predefined limiting speed in a first operating mode, the vehicle speed settable between the limiting speed and a maximum regulable speed in a second operating mode, comprising:

providing a kinesthetic signal to a driver of the vehicle indicating the limiting speed has been reached in the first operating mode with an absence of a speed limiting object in front of the vehicle, wherein the kinesthetic signal includes:

increasing the vehicle speed in the first operating mode beyond the limiting speed; and after the increasing step, setting the vehicle speed to the limiting speed while continuing to detect an absence of a speed limiting object.

2. The method according to claim 1, further comprising switching the adaptive distance and speed control system from the first operating mode to the second operating mode by operation of an operating element by a driver, the vehicle speed continuously regulable above the limiting speed only after operation of the operating element.

3. The method according to claim 1, further comprising implementing a low-speed following mode in the first operating mode, the vehicle automatically stoppable and movable in the low-speed following mode.

4. The method according to claim 1, further comprising informing a driver at least one of (a) visually and (b) acoustically of the setting of the limiting speed.

5. A device for regulating a speed of a vehicle, comprising:

a detection device configured to detect objects in front of the vehicle; and an adaptive distance and speed control system including at least two operating modes, the adaptive distance and speed control system configured to set a vehicle speed between a standstill and a predefined limiting speed in a first operating mode and to set the vehicle speed between the limiting speed and a maximum regulable speed in a second operating mode, the adaptive distance and speed control system including a calculation device configured to determine a vehicle speed to be set, the adaptive distance and speed control system configured to provide a kinesthetic signal to a driver of the vehicle indicating the limiting speed has been reached in the first operating mode with an absence of a speed limiting object in front of the vehicle, wherein the kinesthetic signal includes: increasing the vehicle speed in the first operating mode beyond the limiting speed, and after the increasing step, setting the vehicle speed to the limiting speed while continuing to detect an absence of a speed limiting object.

6. The device according to claim 5, further comprising at least one driver-operable device configured to trigger a switch from the first operating mode to the second operating mode.

* * * * *